United States Patent [19]

Krämer

[11] 4,252,089
[45] Feb. 24, 1981

[54] REGULATOR FOR THE FUEL QUANTITY TO BE INJECTED INTO AN INTERNAL COMBUSTION ENGINE WITH SELF-IGNITION

[75] Inventor: Manfred Krämer, Schwieberdingen, Fed. Rep. of Germany

[73] Assignee: Robert Bosch GmbH, Stuttgart, Fed. Rep. of Germany

[21] Appl. No.: 973,661

[22] Filed: Dec. 27, 1978

[30] Foreign Application Priority Data

Dec. 27, 1977 [DE] Fed. Rep. of Germany ....... 2758324

[51] Int. Cl.$^3$ .............................................. F02D 1/04
[52] U.S. Cl. .................................... 123/365; 123/379; 123/374
[58] Field of Search ....... 123/140 MC, 140 R, 140 A, 123/140 FG, 140 FP, 140 J, 140 CC

[56] References Cited

U.S. PATENT DOCUMENTS

| 3,130,599 | 4/1964 | Haas ............................ 123/140 R X |
| 3,923,025 | 12/1975 | Isobe et al. ...................... 123/140 JX |

FOREIGN PATENT DOCUMENTS

1080814  4/1960  Fed. Rep. of Germany ...... 123/140 R

*Primary Examiner*—Harry N. Haroian
*Attorney, Agent, or Firm*—Edwin E. Greigg

[57] ABSTRACT

A fuel quantity regulator for self-igniting internal combustion engines having a fuel quantity regulator rod, an actuator for the regulator rod and an rpm governor. Between the actuator and the regulator rod there is interposed a rocker arm and an intermediate lever. The rocker arm is connected with the actuator, and the intermediate lever is connected to the regulator rod. During correct operation, the rocker arm engages a recess in the intermediate lever and as a result the actuator movement is transmitted to the regulator rod. When an error signal is generated, however, the rocker arm disengages the recess in the intermediate lever, and as a result the regulator rod is disconnected from the actuator so that only the rpm governor is operational relative to the regulator rod.

17 Claims, 1 Drawing Figure

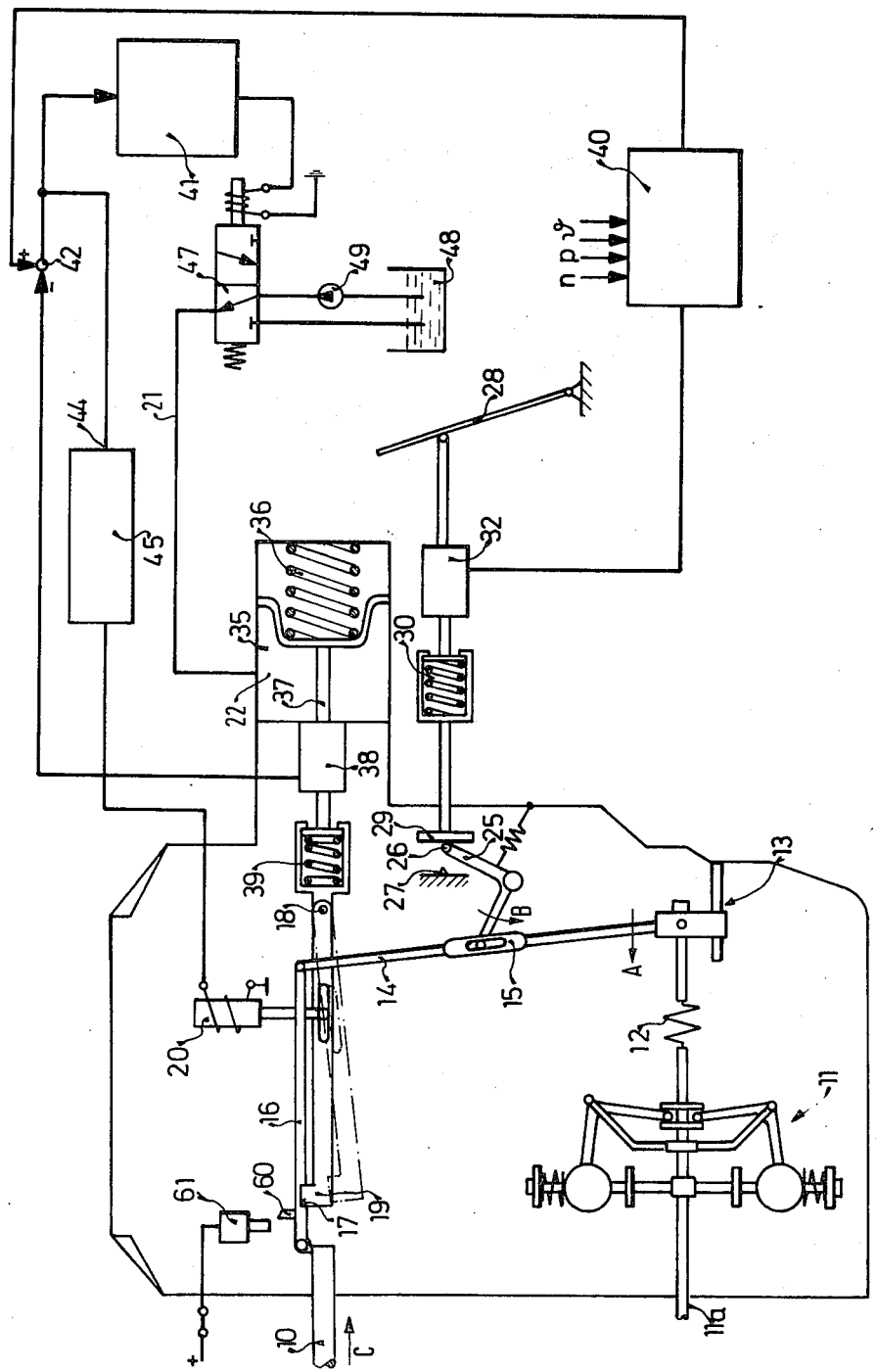

REGULATOR FOR THE FUEL QUANTITY TO BE INJECTED INTO AN INTERNAL COMBUSTION ENGINE WITH SELF-IGNITION

FIELD OF THE INVENTION

The invention relates to fuel quantity regulators for self-igniting internal combustion engines. The fuel quantity regulator includes a regulator rod, whose position directly determines the fuel quantity to be supplied, an rpm metering apparatus and an actuator which acts on the regulator rod.

BACKGROUND OF THE INVENTION

Influencing the position of the regulator rod both by means of a centrifugal governor and by means of a magnetic actuator is already known. In the known arrangement, the effect of the centrifugal governor attains increasing significance with increasing rpm.

It has now been demonstrated that the known fuel quantity regulator is inadequately secured against incorrect actuator or error signals for the actuator magnet. The location of the source of the error is of secondary importance, since no matter whether the error is with the transducers for the operational characteristic n or with the signal processing, the actuator signal for the actuator magnet is in each case incorrect.

OBJECT, SUMMARY AND ADVANTAGES OF THE INVENTION

It is a principle object of the invention to set the fuel quantity to be injected in accordance with the regulator output signal at correct actuation signals for a regulator which precedes the actuator, and to separate the actuator from the regulator rod when an error signal is given, in order to allow an rpm governor to operate alone.

This object is attained by moving a rocker arm, which is connected with the actuator, to engage a recess in an intermediate member, which is connected to the regulator rod, during correct operation; and by having this rocker arm swing away when there is an error actuation signal. In this way, the operational connection between the actuator and the regulator rod is released, and only the rpm governor, of conventional design, is then operational.

The fuel quantity regulator according to the invention has one advantage over the prior art, in that when an error signal appears, the actuator can be separated from the regulator rod, but a continuing emergency operation is still accomplished by means of which overload of the internal combustion engine is prevented. In the simplest case, this emergency operation can be effectuated by means of a top speed governor.

Another advantage results if a stop apparatus is provided between the adjustment lever and the accelerator pedal and the regulatory behavior is set to be such that an adjustment lever path of 70% corresponds to an accelerator pedal displacement of 100%. By this means it is assured that during normal operation, the stop does not come into effect, because the adjustment lever position moves ahead of the position of the accelerator pedal in the direction of an additional quantity of fuel.

The invention will be better understood as well as further objects and advantages thereof become more apparent from the ensuing detailed description of a preferred embodiment taken in conjunction with the drawing.

BRIEF DESCRIPTION OF THE DRAWING

An exemplary embodiment of the invention is shown schematically in the signal FIGURE. There is shown a fuel quantity regulator for the fuel quantity to be injected into self-igniting internal combustion engine together with a block circuit diagram of associated control devices.

DESCRIPTION OF THE PREFERRED EMBODIMENT

A regulator rod is indicated by reference numeral 10. The position of the regulator rod 10 determines the fuel supply quantity. An rpm metering apparatus is indicated by the reference numeral 11. The rpm metering apparatus is equipped with flyweights, and is driven by a shaft 11a connected with the internal combustion engine. The shaft 11a is followed by a drag spring 12 and a coupling member 13 on its outlet side. The coupling member 13 is connected to one end of a regulator lever 14, the other end of which is pivotably mounted on an intermediate member 16. Between its two ends, the regulator lever 14 has a slotted part in 15. The intermediate member 16 furnishes the connection between the regulator lever 14 and the regulator rod 10. The intermediate lever 16 has a recess 17, which is engaged by a rocker arm 19. The rocker arm 19 is pivotably mounted at pivotal point 18. The position of the rocker arm 19 is controllable by means of an electromagnet 20.

An adjustment lever 25 is guided within the slotted portion 15 of the regulator rod 14. The second end 26 of the adjustment lever 25 is movable between a fixed stop 27 and a second stop 29 which is indirectly coupled with an accelerator pedal 28. Between this stop 29 and the accelerator pedal 28 there are further provided a spring 30 and a transducer 32 for the accelerator pedal position.

A hydraulic actuator 35 with a return spring 36 acts upon the position of the pivotal point 18 of the rocker arm 19 by means of its actuator member 37 via a transducer 38 and a spring element 39. The transducer 38 indicates the position of the actuator member 37.

An electronic control device 40 is provided with operational parameter inputs such as rpm, pressure, various temperatures and the accelerator pedal position. The control device 40 generates an output signal as the set point signal for a regulator 41. An actual value signal is generated by the transducer 38, and a differential signal is generated in a summation device 42. The output of this summation device 42 is connected with both the regulator 41 and the input 44 of an error recognition circuit 45. The output of the error recognition circuit 45 is coupled with the magnetic winding of the electromagnet 20.

The output signal of the regulator 41 is applied to a spring-loaded 2/way solenoid valve 47, which in the excited state permits a pump 49, controlled by a not shown overflow valve to deliver a hydraulic medium from a container 48 through the solenoid valve 47 and line 21 into the pressure chamber 22 of the spring-loaded hydraulic actuator 35. In the nonexcited state of the solenoid valve 47, the pressure medium flows back through the line 21 into the container 48, under the influence of the spring 36.

The mode of operation of the fuel quantity regulator briefly described above is as follows:

The instantaneous values of the individual operational parameters (n, p, v, and input from transducer 32)

are stored in the electronic control device 40 and a setpoint signal for the position of the actuator member 37 is generated at the output of the electronic control device 40. This set-point signal is compared with an actual-value signal in the summation device 42, whose output signal is delivered to the error recognition circuit 45 and to the regulator 41. During normal engine operation and correct operation of the individual circuit elements, i.e., those elements generating the inputs to the control device 40, the input signal to the regulator 41 has a continuous value of approximately zero. The regulator 41 thereby provides a square wave signal to the solenoid valve 47 with a duty cycle of 1:1, which causes the actuator 35 to be subjected to and relieved of hydraulic medium in pulse-like fashion.

During correct operation, the electromagnet 20 is not excited and the rocker arm 19 engages the recess 17 of the intermediate member 16 between the regulator rod 10 and the regulator lever 14. With the thus provided firm connection between the actuator member 37 and the regulator rod 10, a fuel supply quantity is obtained in accordance with the position of the actuator member 37.

During operation of the internal combustion engine, the shaft 11a rotates and the metering apparatus 11 determines a certain position of the coupling member 13. The adjustment lever 25 as well as the actuator member 37, attains a certain position via the slotted portion 15. Since 100% of the accelerator pedal displacement corresponds to a load position of approximately 70% of QVL max(=minimum of full load fuel quantity=QVL min) of the adjustment lever 25, the adjustment lever 25 normally does not move towards its stop position which is defined by the stop 29. This is true because the position of the adjustment lever 25 leads the accelerator pedal position in the direction of an additional quantity of fuel (arrows A, B & C).

The spring element 30 is compressed after the stop 29 comes into effect. If, when the accelerator pedal is fully depressed and the internal combustion engine is turned off with the aid of the actuator 35 for example caused by switched off driving switch, or shut off at an intermediate rpm the spring element 30 is compressed.

Two failure modes may arise:

In the first mode, an incorrect rpm signal is indicated, and there is the danger that the engine will exceed its top speed. In this case the metering apparatus 11 intervenes and compresses the spring element 39, and/or the spring 36 of the actuator 35. At the same time, the regulator rod 10 is displaced in the direction of a stop and thus a smaller quantity of fuel is supplied to the internal combustion engine.

In the second failure mode, the error recognition circuit 45 is supposed to respond. In this mode the electro-magnet 20 separates the intermediate member 16 and the rocker arm 19. As a result, the actuator 35 does not act upon the regulator rod 10. The stop 29 comes into play, and a normal driving operation with a top speed governor is accomplished. In this case, the maximum fuel quantity supplied corresponds to the minimum quantity at full load, and an overload of the internal combustion engine does not arise. An undesired stopping of the internal combustion engine when the regulator circuit fails is also avoided.

Since the mechanical regulator can override the electro-hydraulic regulator in the direction of a stop, by means of compressing the spring element 39 or the spring 36, the turnoff rpm of the centrifugal governor with the metering apparatus 11 is selected preferably to be somewhat higher than those of the electro-hydraulic regulator.

The fuel quantity regulator further has safety means to block rolling-starts, that is, means to prevent starting the engine without a corresponding actuation of the driving switch. This purpose is achieved by means of a nose 60 on the intermediate member 16 between the regulator rod 10 and the regulator lever 14, whose position can be arrested in the stop position of the regulator rod 10 by means of an electromagnet 61. Since this blocking action can only be lifted via the driving switch, the internal combustion engine can not be engaged unintentionally.

With the fuel quantity regulator which has been described above, a maximum of flexibility can be attained with respect to the possibilities for the intervention of operational characteristics with simultaneous optimal security. Variations are conceivable, to the extent that, for example, an electric actuator can replace the hydraulic-mechanical actuator 35. Furthermore, the electronic control device 40 and the regulator 41 can be combined, as long as a pickup remains for an input signal of the error recognition circuit 45. This signal for the error recognition circuit 45, however, can also be picked up at the output of the regulator 41. Further, the spring element 39 may be omitted if the spring 36 is dimensioned accordingly.

The foregoing relates to a preferred embodiment of the invention, it being understood that other embodiments and variants thereof are possible within the spirit and scope of the invention, the latter being defined by the appended claims.

What is claimed is:

1. A fuel quantity regulator for a self-igniting internal combustion engine comprising:
    a regulator rod, the position of which directly determines the fuel quantity supplied;
    an rpm metering device including flyweights responsive to engine rpm;
    a regulator lever connected at one end to the rpm metering device, and connectable at its other end to the regulator rod;
    an actuator; and
    connecting means including electromagnetically actuable release means for releasably connecting the actuator to the regulator rod, said connecting means being releasable at selectable control values.

2. The fuel quantity regulator as defined in claim 1 wherein said connecting means is releasable at selected open-loop control values.

3. The fuel quantity regulator as defined in claim 1 wherein said connecting means is releasable at selected closed-loop control values.

4. The fuel quantity regulator as defined in claim 1, wherein the connection between the actuator and regulator rod is released in dependence on an error signal.

5. The fuel quantity regulator as defined in claim 4, wherein the error signal is derived from an input signal from the actuator.

6. The fuel quantity regulator as defined in claim 4, further comprising:
    a regulator circuit connectable to the actuator, and wherein the error signal is applied as an input to the regulator circuit.

7. The fuel quantity regulator as defined in claim 4, further comprising:
    a set-point value circuit; and a comparison circuit connected to the set-point value circuit and to the actuator, said comparison circuit producing the error signal from a comparison of a signal produced by the set-point value circuit and a signal produced by the actuator.

8. The fuel quantity regulator as defined in claim 1, further comprising:
an intermediate lever connected to the regulator rod and to the other end of the regulator lever, said intermediate lever including a recess, and wherein said connecting means includes a pivotable rocker arm which engages the recess in said intermediate lever.

9. The fuel quantity regulator as defined in claim 1, wherein the actuator comprises:
a cylinder and a hydraulic piston which is displaceable within the cylinder against a spring force.

10. The fuel quantity regulator as defined in claim 1, wherein the actuator is electrically actuatable.

11. The fuel quantity regulator as defined in claim 1, wherein the connecting means includes a spring element connected to the actuator.

12. The fuel quantity regulator as defined in claim 1, further comprising:
an accelerator pedal; and
a stop located between the regulator lever and the accelerator pedal.

13. The fuel quantity regulator as defined in claim 11, further comprising:
an adjustment lever, and wherein the regulator lever includes a slot in which one end of the adjustment lever is engaged, the other end of the adjustment lever being engageable with the stop.

14. The fuel quantity regulator as defined in claim 12, further comprising:
a spring element located between the accelerator pedal and the stop.

15. The fuel quantity regulator as defined in claim 12, further comprising:
an adjustment lever, and wherein a 100% accelerator pedal displacement corresponds to less than a 100% displacement of the adjustment lever.

16. The fuel quantity regulator as defined in claim 12, further comprising:
an adjustment lever, and wherein a 100% accelerator pedal displacement corresponds to a 70% displacement of the adjustment lever.

17. The fuel quantity regulator as defined in claim 1, further comprising:
blocking means for retaining the regulator rod in a stop position, wherein the regulator rod is released from the stop position by actuation of the driving switch of the engine.

* * * * *